*NO PRINTED SPECIFICATION AVAILABLE*

8537X

B. F. HAYS.

EASY CHAIR.

Patented Dec. 17. 1834.

Benjamin F. Hays, of Pittsfield, Mss:
Letters Patent.

The schedule referred to in these Letters Patent & making part of the same, containing a description in the words of the said Benjamin Franklin Hays, himself, of his improvement in an easy chair –

---

To all to whom these presents shall come; Be it known that I. Benjamin F. Hays, of Pittsfield, in the County of Berkshire, and State of Massachusetts, have invented a new and useful improvement in an easy chair, and that the following is a full and exact description thereof – .

Figure 1:
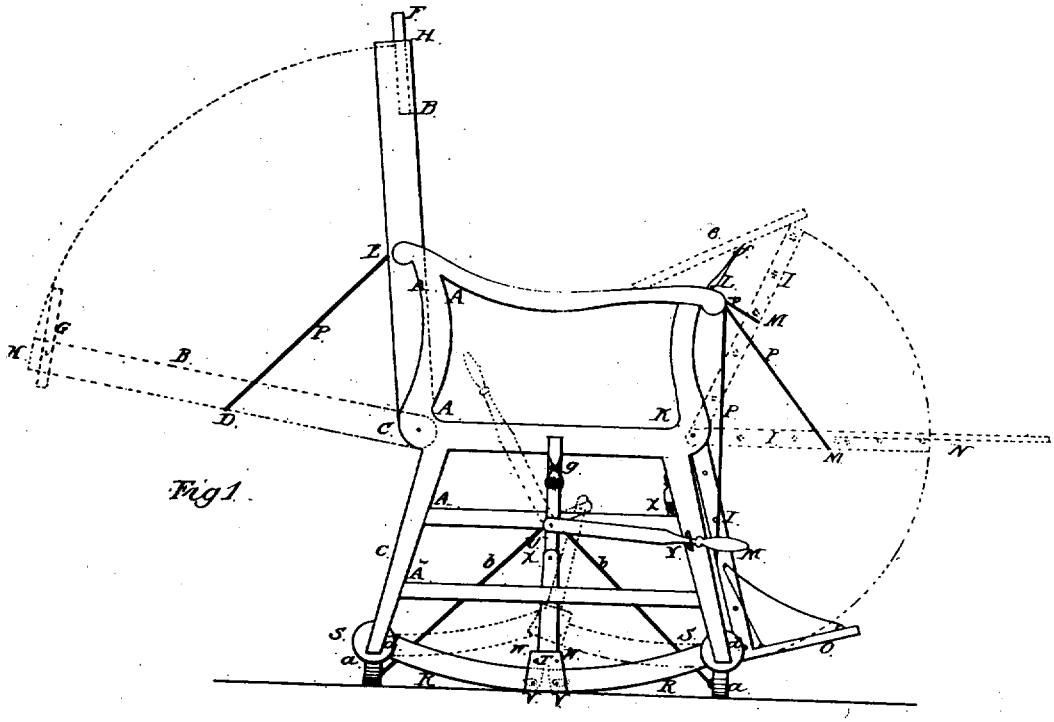
Figure 2:
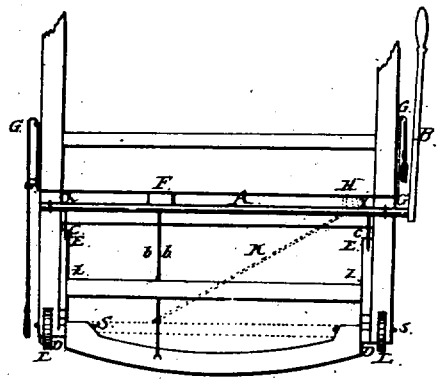

Fig. 1. on the drawing, is a side view of said chair – A. frame work of suitable dimensions for size and strength. B. back attached by pivot C. made secure at any given angle by the strap P. cord or other substance fixed to the back at D. and the frame at E. by a buckle or rolling cylinder, around which the strap may be coiled by means of a crank. or some simple safe fastning. F. head piece attached to side pieces of back by the pivot H. to be turned up for a head board as at G. when the back is laid into the position of a bed, represented by the dotted lines BDHG. I. foot pieces attached to frame by pivot K. made in two parts so that either half can be raised to any given angle and made secure by strap cord or other substance attached to foot pieces at M.M.M. and to the frame at L. by a similar methods as at E. N. pannels drawn out of foot pieces as represented by the horizontal dotted lines, to give sufficient length for a bed, and by means of sliding into the foot pieces, when in a perpendicular position, the chair can be made of ordinary height. O. foot board attached to the foot pieces by means of a wire, cord, or otherwise, with screws so arranged on each end of foot pieces so as to raise or lower the foot board at pleasure, to be used while in a chair, or when in a bed, or dispensed with in either. P.P.P.P. strap, cord, or other substance to make back & foot pieces fast at any angle. R.R. side rockers confined to the legs of chair by the pivots S.S. T. socket & sliding joint in side rockers, which joint is made secure by a mortise & boxed with hard substance Drawing in the end of each of the rockers R.R. where they meet in the socket T. and
slide on the friction rollers V.V. or the same result may be produced by having
the sliding mortice operate on the pivots S.S. WW. rivets fastning the socket T.
to a piece of wood or metal joined to the short arm of the lever U. by a
pin making a joint at X. U. lever attached to an arbour extending cross-
wise and fixed to the frame by means of staples or otherwise; to the opposite
end of which arbour, on the opposite side of the frame is fixed another short
arm of the lever U. to which is attached a pitman or compound arm,
socket, and rockers, exactly corresponding with RR VV.T.WW.X.U. The lever
U. being detached from the frame to which it is made fast at Y. by means
of a staple & spiral or common spring, is drawn upward and backward (the
rockers RR. at the same time sliding into the socket T.) untill the lever pitman
& side rockers occupy the position defined by the dotted lines, or the pit
man may be raised perpendicularly by coggs mashing into a wheel on
the short arm of lever U. leaving the chair resting upon the cross rockers a
a. which are made fast by the rods bb. one end of each of which is
made fast by a staple to the cross rockers at aa. the other end of each
made fast by a staple to a sliding bar, represented by a dotted line in
the frame at C. & attached to the arbour on which it slides by staples
or a hole passing thro' the box horizontally corresponding with the size of
the arbour. to which sliding bar is attached the strap g. cord or other
substance, sufficiently strong to move the bar back & forth, on the arbour
in a horizontal direction — by which motion the cross rockers aa. are folded
into a horizontal position by turning on the pivots SS. or pressed out to a pe
-pendicular position as at aa. dd. rollers (or castors) attached to frame [illegible]
pivot SS. forming a check to either pair of rockers, preventing the chair or [illegible]
from overturning and when both pair of rockers are withdrawn from a ro
-ing position, forming wheels on which the whole can be moved at pleas[ure]
in any direction. e. brest board attached to arm pieces by a hook & staple
be elevated at pleasure forming an eating, working writing, or sleeping ta[ble]
Fig. 2. showing a front or rear view of chair. A. arbour attached to fra[me]
by staples or otherwise. B. long arm of lever outside of chair. C.C. short a[rm]
of lever attached to arbour A. at XX. directly over the pitman ZZ. an[d]

and socket which are attached to the side rockers, the ends of which are rep
resented at DD. EE. joint in the short arm of lever, corresponding with X
in fig. 1. F. ends of sliding bar, to which are attached (the rods bb. in fig. 1).
The ends of which sliding bar rest on the frame work (or rounds) keeping i
horizontal while moving back & forth on the arbour, by means of the strap
& cord, or other substance attached to the bar at F. and passing through stap
with friction rollers as at G.G. on either side of the chair - by drawing th
strap on the right side, the sliding bar is moved on the arbour A to H. a
having the rods bb. (as in fig. 1). attached to the bar, the cross rockers are fold
into a horizontal position (represented by the dotted lines lying in a horizo
tal direction) turning on the pivots SS. K shows the position or angle of th
rods bb: when the sliding bar is at H. and the cross rockers folded in - I
edge view of rollers or castors — an arbour or axle with light wheels may
attached to the frame; so as to enable an invalid who has the use of his ar
to move himself in any direction with ease —
The back and sides can be stuffed and trimed in any style of plain
or elegance. All the changes can be performed by an individual himself
while setting in the chair. he can by the lever V raise himself from a roll
to a rocking chair. from a rocking chair to a cradle motion by raising t
strap g, and letting back the lever V. By letting down the back and ra
ing the foot pieces one at a time an invalid can make his own bed
by raising the back and letting down one of the foot pieces, and changi
back from the cross to the side rockers. a person with a fractured limb,
enjoy the pleasure of a rocking chair without injury - by raising both
back and foot pieces, a crib or cradle is formed of any desirable dime
The whole is plain and simple in its construction, fitted for all the pur
of the nursery and parlour, adapted to all classes of invalids, easily ch
ged into a great variety of positions to suit dropsical, asthmatic, an
rheumatic patients - cheap and of convenient size, light & portable. ca
conveyed from one apartment or place to another is well calculated
journeying with weak and feeble persons, affording a comfortable b
when needed by the way - well calculated for a hospital, surgeons,
dentists chair - and not less adapted for all the ordinary purposes of common rocking chair, or a single bed, in a private family or public offic
What I claim as my own invention, and not previously known, in the
above described machine, is. 1st. holding the back and foot pieces at any giv
en angles by a simple strap & buckle or rolling cilinder, around which the
strap or cord may be wound by a crank. 2nd. The sliding pannels in the
foot pieces, by means of which the chair can be made of ordinary height
and the bed of any required length. 3rd. head piece in the back so cal
culated as to lengthen the back when in a chair, and shorten it when i
e bed forming a head piece when in a perpendicular position, and head
board when in a horizontal position. 4th. The side rockers with a joint i
the middle so made as to be operated on, by a lever, by which an ind
vidual can raise himself by a simple and easy motion, from a rolling
to a rocking chair. 5th. cross rockers confined by the same pivot (though
not necessarily) which confines the side rockers. 6th. sliding or moving bar
to which the cross rockers are attached by rods & staples, and by the movin
of which bar on the arbour, the cross rockers are folded into a horizontal, or
pressed out into a perpendicular position. 7th. Rollers and castors, so applied
as to form a check to both pair of rockers, and operating on the same pivot Witnesses
H. Hubbard
R. Packard Benjn. F. Hays Drawing Rec'd.
M.G.

[1725 [illegible]